United States Patent
Taki et al.

(10) Patent No.: US 9,379,411 B2
(45) Date of Patent: Jun. 28, 2016

(54) NON-AQUEOUS ELECTROLYTE SECONDARY BATTERY

(75) Inventors: Takayuki Taki, Tokyo (JP); Yuyu Ohnuma, Tokyo (JP); Hiroaki Watanabe, Tokyo (JP); Atsuki Shibuya, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 163 days.

(21) Appl. No.: 13/816,672

(22) PCT Filed: Aug. 8, 2011

(86) PCT No.: PCT/JP2011/068040
§ 371 (c)(1),
(2), (4) Date: Feb. 12, 2013

(87) PCT Pub. No.: WO2012/029505
PCT Pub. Date: Mar. 8, 2012

(65) Prior Publication Data
US 2013/0149603 A1 Jun. 13, 2013

(30) Foreign Application Priority Data
Aug. 31, 2010 (JP) .................................. 2010-193130

(51) Int. Cl.
*H01M 10/056* (2010.01)
*H01M 4/587* (2010.01)
(Continued)

(52) U.S. Cl.
CPC ............ *H01M 10/056* (2013.01); *H01M 4/587* (2013.01); *H01M 10/0525* (2013.01);
(Continued)

(58) Field of Classification Search
CPC .................................................... H01M 10/056
USPC .................... 429/188; 977/773, 948
See application file for complete search history.

(56) References Cited

U.S. PATENT DOCUMENTS

| 5,443,928 A | 8/1995 | Takeuchi et al. |
| 2003/0113635 A1* | 6/2003 | Gan et al. ............ 429/326 |

(Continued)

FOREIGN PATENT DOCUMENTS

| CN | 1856890 | 11/2006 |
| EP | 0520667 | 12/1992 |

(Continued)

OTHER PUBLICATIONS

International Search Report, PCT/JP2011/068040, filed Nov. 22, 2011.

*Primary Examiner* — Stewart Fraser
*Assistant Examiner* — Rachel L Zhang
(74) *Attorney, Agent, or Firm* — Young & Thompson

(57) ABSTRACT

A non-aqueous electrolyte secondary battery has a negative electrode containing graphite particles as a negative electrode active material, a positive electrode containing a lithium-containing oxide of a transition metal or a lithium-containing phosphate of a transition metal as a positive electrode active material, and a non-aqueous electrolyte in which a lithium salt is dissolved in an organic solvent. The graphite particles have an exposed crystal face and are bonded with each other to be parallel to the orientation plane of each other, and the non-aqueous electrolyte contains a phosphate ester compound represented by the following general formula (1) to which an alkynyl group is bonded and/or an unsaturated phosphate ester compound represented by the following general formula (2):

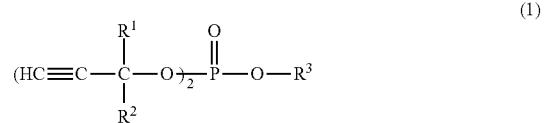

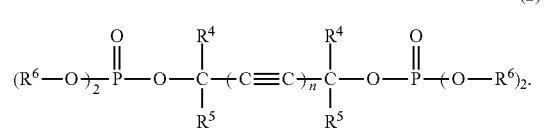

19 Claims, 1 Drawing Sheet

(51) Int. Cl.
  *H01M 10/0525* (2010.01)
  *H01M 10/0567* (2010.01)
  *H01M 10/0569* (2010.01)
  *H01M 4/02* (2006.01)
  *B82Y 30/00* (2011.01)
  *H01M 4/58* (2010.01)

(52) U.S. Cl.
  CPC ...... *H01M10/0567* (2013.01); *H01M 10/0569* (2013.01); *B82Y 30/00* (2013.01); *H01M 4/5825* (2013.01); *H01M 2004/021* (2013.01); *H01M 2004/027* (2013.01); *H01M 2300/0025* (2013.01); *H01M 2300/0028* (2013.01); *Y02E 60/122* (2013.01); *Y02T 10/7011* (2013.01)

(56) References Cited

U.S. PATENT DOCUMENTS

| | | | |
|---|---|---|---|
| 2006/0134521 | A1 | 6/2006 | Shima |
| 2010/0015514 | A1* | 1/2010 | Miyagi et al. ................. 429/129 |

FOREIGN PATENT DOCUMENTS

| | | | |
|---|---|---|---|
| EP | | 1213782 | 6/2002 |
| JP | | 7-089706 | 4/1995 |
| JP | | 7-134988 | 5/1995 |
| JP | | 10-294101 | 11/1998 |
| JP | | 11-067266 | 3/1999 |
| JP | | 2002-198092 | 7/2002 |
| JP | | 2007-141831 | 6/2007 |
| JP | | 2009-004304 | 1/2009 |
| JP | | 2011-124039 | 6/2011 |
| JP | | 2011124039 | * 6/2011 |

* cited by examiner

NON-AQUEOUS ELECTROLYTE SECONDARY BATTERY

TECHNICAL FIELD

The present invention relates to a non-aqueous electrolyte secondary battery, and specifically relates to a non-aqueous electrolyte secondary battery having a negative electrode containing graphite particles as a negative electrode active material, a positive electrode containing a lithium-containing oxide of a transition metal or a lithium-containing phosphate of a transition metal as a positive electrode active material, and a non-aqueous electrolyte in which a lithium salt is dissolved in an organic solvent, wherein the above-mentioned graphite particles have an exposed crystal face and are bonded with each other so as to be parallel to the orientation plane of each other, and the non-aqueous electrolyte contains a phosphate ester compound having a specific structure incorporated in the non-aqueous electrolyte.

BACKGROUND ART

In accordance with the widespread use of portable electronic devices such as portable personal computers, handy video cameras and information terminals in recent years, non-aqueous electrolyte secondary batteries having a high voltage and a high energy density have been widely used as power sources. Furthermore, in view of environmental problems, battery automobiles and hybrid automobiles utilizing electrical power as a part of the power thereof have been put into practical use, and thus a non-aqueous electrolyte secondary battery having a high capacity is required.

Graphite, which is used in negative electrodes of non-aqueous electrolyte secondary batteries, had a problem that it generally has a higher capacity at a higher crystallinity, whereas a side reaction due to the reductive decomposition of an electrolyte which occurs on the surface of the graphite increases as the crystallinity becomes higher. When this side reaction increases, a negative electrode capacity decreases due to the peeling of crystal layers of graphite particles, or a decomposed product due to the side reaction accumulates on the surface of the negative electrode and the internal resistance of the surface of the negative electrode increases, thereby the battery performance decreases. Therefore, in order to prevent the peeling of the crystal layers of graphite particles, countermeasures such as (i) "a method using graphite particles having a surface coated with a noncrystalline carbon material as a negative electrode active material", (ii) "a method using optical anisotropic small spherical bodies (mesocarbon microbeads: MCMB) that are obtained upon heating of pitches at around 400° C. as a negative electrode active material", (iii) "a method including kneading, calcining and pulverizing a binder that can be graphitized with microcrystalline graphite, and using the product as a negative electrode active material", and (iv) "a method using an electrolyte additive that protects a negative electrode in an electrolyte" have been made.

As the above-mentioned (i), for example, Patent Literature 1 enables use of graphite having a high crystallinity as a negative electrode active material by covering the surface with amorphous carbon by a chemical vapor deposition process.

As the above-mentioned (ii), for example, Patent Literature 2 discloses a method using "a graphite powder, to which lithium can be intercalated, which is a spherical substance, and also an optically anisotropic granular substance having a lamella structure formed of a single phase, and this granular substance is formed by graphitizing mesophase small spherical bodies generated in a process of a heat treatment of pitch at a low temperature, wherein the graphite powder has a spacing of a 002 face ($d_{002}$) by a wide angle X-ray diffraction method of from 3.36 to 3.40 Angstrom and a specific surface area by a BET method of 0.7 to 5.0 $m^2/g$" as a negative electrode active material.

As the above-mentioned (iii), for example, Patent Literature 3 discloses a method using "a powdery carbon material, which is a mixture of generally-spherical graphite particles (A) each having a minute projection on the surface, and obtained by impregnating and coating a base material formed by shaping clove-like graphite into a spherical shape with a mixture of pitch and carbon black and baking it at 900 to 1,500° C., and carbonaceous particles (B) obtained by baking a mixture of pitch and carbon black at 900 to 1,500° C., and thereafter crushing and sizing it, and has composite peaks of a G band having peaks in the vicinity of 1,600 $cm^{-1}$ and in the vicinity of 1,580 $cm^{-1}$, and at least one peak in the vicinity of 1,380 $cm^{-1}$ of a D band in a Raman spectrum spectral analysis using argon laser Raman light having a wavelength of 514.5 nm, and having a poly-phase structure having a spacing $d_{002}$ of a crystal plane obtained by X-ray wide-angle diffraction of 0.335 to 0.337 nm" as a negative electrode active material.

The above-mentioned (i) has a problem that the surfaces of the graphite particles are not exposed, and thus the cost increases in the step for coating the surfaces with graphite having a low crystallinity; the above-mentioned (ii) has a problem that the cost increases in the step for removing the MCMB from the pitch; and the above-mentioned (iii) has problems from the viewpoints of cost and processes since a treatment is conducted by using pitch. In the above-mentioned (ii) and (iii), it is essential to conduct a pretreatment, and a process to make the orientation planes of the graphite particles used as a negative electrode active material non-parallel is conducted.

Namely, in the case when graphite particles having a high crystallinity are used as a negative electrode active material, a countermeasure to make the orientation planes of the graphite particles non-parallel, or to coat the surfaces of the particles with a carbon material having a low crystallinity or the like, namely, to treat the crystal faces of the particles to prevent the faces from being exposed, has been made.

Furthermore, as the electrolyte additive that protects a negative electrode in the above-mentioned (iv), for example, 1,3-propanesultone, vinylethylene carbonate, 1,3-propanesultone, butanesultone, vinylene carbonate, vinylethylene carbonate and the like are known, and among these, vinylene carbonate is widely used since it is highly effective. For example, Patent Literature 4 discloses "a lithium secondary battery formed of a positive electrode, a negative electrode containing a carbon material as a negative electrode material, and an electrolyte in which an electrolyte is dissolved in a non-aqueous solvent, wherein the above-mentioned non-aqueous solvent contains propylene carbonate, a chain carbonate and vinylene carbonate".

It is considered that the above-mentioned electrolyte additive forms a stable coating that is called as an SEI (Solid Electrolyte Interface) on the surface of the negative electrode, and this coating covers the surface of the negative electrode and suppresses the reductive decomposition of the electrolyte to thereby protect the negative electrode.

However, a sufficient effect could not be obtained when the electrolyte additive was used in a non-aqueous electrolyte secondary battery having a negative electrode using graphite particles in which the graphite particles are bonded with each other so as to be parallel to the orientation plane of each other, i.e., the orientation planes of the particles have not been subjected to a non-parallelization treatment in a negative electrode active material, and thus the non-aqueous electrolyte secondary battery could not be stably used for a long period. In the case when the electrolyte additive is excessively added so as to compensate this disadvantage, a problem that the thickness of a coating as formed increases and the resistance elevation rate increases to conversely cause decrease of the battery performance is caused, and thus addition of these electrolyte additives to an electrolyte was insufficient to improve the balance of both of the output and capacity of the battery.

Therefore, in a non-aqueous electrolyte secondary battery having a negative electrode containing graphite particles as a negative electrode active material, a positive electrode containing a lithium-containing oxide of a transition metal or a lithium-containing phosphate of a transition metal as a positive electrode active material, and a non-aqueous electrolyte in which a lithium salt is dissolved in an organic solvent, wherein the graphite particles have an exposed crystal face and are bonded with each other so as to be parallel to the orientation plane of each other, both of the output and capacity of the battery were not at sufficient levels, and thus a non-aqueous electrolyte secondary battery that improves the balance thereof has been desired.

Patent Literature 5 and Patent Literature 6 disclose "an electrochemical cell, which contains a negative electrode that intercalates with an alkali metal, a positive electrode containing an electrode active material that intercalates with the alkali metal, a non-aqueous electrolyte that activates the negative electrode and positive electrode, and a phosphate additive that is added to the electrolyte, wherein the phosphate additive is represented by the general formula: (R'O)P(=O) (OR$^2$) (OR$^3$), wherein R$^1$, R$^2$ and R$^3$ are the same or different, and at least one, but not all three, of the R groups is a hydrogen atom, or at least one of the R groups has at least 3 carbon atoms and contains an sp or sp$^2$ hybridized carbon atom bonded to an sp$^3$ hybridized carbon atom bonded to the oxygen atom bonded to the phosphorous atom, and that the negative electrode may contain a carbon material (for example, coke, carbon black, graphite, acetylene black, carbon fibers, glassy carbon and the like) as a negative electrode active material".

However, Patent Literature 5 and Patent Literature 6 do not disclose at all the effect and preferable conditions for use in the case when the above-mentioned phosphate additive is used in a negative electrode containing graphite particles having a high crystallinity, each having an exposed crystal face and are bonded with each other so as to be parallel to the orientation plane of each other as a negative electrode active material.

CITATION LIST

Patent Documents

Patent Literature 1: European Patent Application Laid-Open No. 0520667
Patent Literature 2: Japanese Patent Application Laid-Open No. 7-134988
Patent Literature 3: Japanese Patent Application Laid-Open No. 2009-4304
Patent Literature 4: Japanese Patent Application Laid-Open No. 11-67266
Patent Literature 5: U.S. Pat. No. 5,443,928
Patent Literature 6: European Patent Application Laid-Open No. 1213782

SUMMARY OF INVENTION

Technical Problem

Therefore, the present invention aims at providing a non-aqueous electrolyte secondary battery having a negative electrode containing graphite particles as a negative electrode active material, a positive electrode containing a lithium-containing oxide of a transition metal or a lithium-containing phosphate of a transition metal as a positive electrode active material, and a non-aqueous electrolyte in which a lithium salt is dissolved in an organic solvent, which can improve the balance of both of the output and capacity of the battery in the case when a negative electrode in which the above-mentioned graphite particles have an exposed crystal face and are bonded with each other so as to be parallel to the orientation plane of each other is used.

Solution to Problem

The present inventors have done intensive studies and consequently found that the above-mentioned object can be achieved by using a non-aqueous electrolyte containing a specific phosphoric acid ester compound to which an alkynyl group is bonded, and completed the present invention.

Namely, the present invention provides a non-aqueous electrolyte secondary battery having a negative electrode containing graphite particles as a negative electrode active material, a positive electrode containing a lithium-containing oxide of a transition metal or a lithium-containing phosphate of a transition metal as a positive electrode active material, and a non-aqueous electrolyte in which a lithium salt is dissolved in an organic solvent, wherein the graphite particles have an exposed crystal face and are bonded with each other so as to be parallel to the orientation plane of each other, and the non-aqueous electrolyte contains a phosphate ester compound represented by the following general formula (1) to which an alkynyl group is bonded and/or an unsaturated phosphate ester compound represented by the following general formula (2):

[Chemical Formula 1]

wherein R$^1$ and R$^2$ each independently represents a hydrogen atom or an alkyl group having 1 to 8 carbon atom(s), and R$^3$ represents an alkyl group having 1 to 8 carbon atom(s), an alkenyl group having 2 to 8 carbon atoms, an alkynyl group having 2 to 8 carbon atoms or a halogenated alkyl group having 1 to 8 carbon atom(s),

[Chemical Formula 2]

wherein $R^4$ and $R^5$ each independently represents a hydrogen atom or an alkyl group having 1 to 8 carbon atom(s), $R^6$ represents an alkyl group having 1 to 8 carbon atom(s), an alkenyl group having 2 to 8 carbon atoms, an alkynyl group having 2 to 8 carbon atoms or a halogenated alkyl group having 1 to 8 carbon atom(s), and n represents a number of 1 or 2.

Advantageous Effects of Invention

The effect of the present invention is that it provided a non-aqueous electrolyte secondary battery having a negative electrode containing graphite particles as a negative electrode active material, a positive electrode containing a lithium-containing oxide of a transition metal or a lithium-containing phosphate of a transition metal as a positive electrode active material, and a non-aqueous electrolyte in which a lithium salt is dissolved in an organic solvent, which can improve the balance of both of the output and capacity of the battery and enables maintenance of a small internal resistance and a high electric capacity, in the case when a negative electrode in which the above-mentioned graphite particles have an exposed crystal face and are bonded with each other so as to be parallel to the orientation plane of each other was used.

DESCRIPTION OF EMBODIMENTS

Hereinafter the non-aqueous electrolyte secondary battery of the present invention will be explained in detail based on preferable exemplary embodiments. A useful non-aqueous electrolyte for a second battery has not been known until now in the case when a negative electrode containing graphite particles having an exposed crystal face and being bonded with each other so as to be parallel to the orientation plane of each other as a negative electrode active material and a positive electrode containing a lithium-containing oxide of a transition metal or a lithium-containing phosphate of a transition metal as a positive electrode active material are combined, whereas the present invention is characterized in that it enables maintenance of a small internal resistance and a high electric capacity in a non-aqueous electrolyte secondary battery having the above-mentioned positive electrode and negative electrode in combination, by incorporating a phosphate ester compound represented by the above-mentioned general formula (1) to which an alkynyl group is bonded and/or an unsaturated phosphate ester compound represented by the above-mentioned general formula (2) in a non-aqueous electrolyte for a second battery in which a lithium salt is dissolved in an organic solvent as a non-aqueous electrolyte for a second battery.

First, the negative electrode used in the present invention will be explained. The negative electrode used in the present invention uses graphite particles having an exposed crystal face and being bonded with each other so as to be parallel to the orientation plane of each other as a negative electrode active material. The raw material of the graphite particles may be either natural graphite or artificial graphite. The natural graphite represents ore mined from the nature such as natural graphite ore, and examples may include clove-like graphite, scale-like graphite, earthy graphite and the like. The artificial graphite is graphite obtained by a calcination treatment of a carbon-containing compound including the above-mentioned natural graphites, coal coke, non-graphitizable carbon, acetylene black, carbon fibers, petroleum coke, hydrocarbon solvents, needle coke, phenol resins, furan resins and the like, and these are generally used after pulverization.

As mentioned above, the graphite particles used in the present invention have orientation planes. The "orientation plane" represents a planular surface of a graphite particle, and a graphite particle having an orientation plane is a particle having a shape with a short axis and a long axis and is also a particle having an aspect ratio of more than 1, and examples include those having shapes of a scale-like, a clove-like, a platelet-like, a partial mass-like, a disc-like, a spindle-like, and the like. That "the particles are bonded with each other so as to be parallel to the orientation plane of each other" is a state in which the graphite particles are bonded with each other, and the respective orientation planes are arranged in a predetermined direction, or a state in which the plate surfaces of the graphite particles are in parallel in a predetermined direction. If the particles are regularly overlapped with each other at the planular surfaces of each other, the case when the particles are not in complete plane-parallel is also considered as being parallel to the orientation plane. Furthermore, also in the case when a binder is contained besides the graphite particles, if the graphite particles are bonded with each other and the respective orientation planes are arranged in a predetermined direction, it is considered that "the particles are bonded in parallel to the orientation plane".

The case when the respective orientation planes of the graphite particles are randomly aggregated or bonded without being arranged in a predetermined direction, the case when the particles are randomly aggregated or bonded via a binder component, or the case when the particles are completely spherical, the orientation planes are not considered as parallel. The bonding of the above-mentioned particles with each other represents a chemical bond, and the aggregation refers to an aggregate that is not chemically bonded but retains its shape as an aggregate.

In general, as the interlayer distance of a crystal of graphite particles is shorten, the graphite particles becomes more homogeneous, the crystallinity is increased, and in artificial graphite, graphite particles having a higher crystallinity can be obtained at a higher calcination temperature. In addition, in the present invention, the evaluation of the crystallinity of the graphite particles was obtained by the measurement result of a spacing of a 002 face ($d_{002}$) by a wide angle X-ray method.

Raman spectroscopy may be exemplified as a method for determining whether the crystal faces of the graphite particles are exposed. In the case when the physical properties of a crystalline carbon material are measured by using Raman spectroscopy by argon laser, the absorption peak at a wavelength around 1,580 $cm^{-1}$ is a peak attributed to the graphite structure, and the absorption peak at a wavelength around wavelength 1,360 $cm^{-1}$ is a peak that is generated by the disturbance of the graphite structure. Furthermore, a peak ratio of these is an index representing the degree of the crystallization (graphitization) of the surface part of the carbon material. In the present invention, the graphite particles having an exposed crystal face refer to those having a ratio of a peak intensity around 1,360 cm$^{-1}$ ($I_D$) to a peak intensity around 1,580 cm$^{-1}$ ($I_G$) [$I_G/I_D$] in argon laser Raman spectroscopy at a wavelength of 514.5 nanometers of 0.10 or less. Meanwhile, coated crystalline carbon materials that are generally used as negative electrode active materials have $I_G/I_D$ of approximately 0.13 to 0.23.

Graphite has a crystal structure in which carbon atoms arranged in hexagons and having a mesh-like plane structure are aggregated in layers, and as the interlayer distance thereof is shorten, the crystallinity is higher, and the electric capacity in the case when used as a negative electrode active material is also increased.

Although the interlayer distance of the graphite particles used in the present invention is not specifically limited, it is preferably 0.3354 to 0.3385 nanometers, more preferably 0.3354 to 0.3380 nanometers, and further preferably 0.3354 to 0.3372 nanometers, so as to maintain a high electric capacity.

Some graphite particles are bonded with each other so as to be parallel to the orientation plane of each other unless undergoing a non-parallelization treatment, and are sometimes difficult to be used in conventional methods as mentioned above. Therefore, in some cases, a treatment such that the graphite particles are bonded or aggregated with each other in a manner that the orientation planes of each other are non-parallel (a non-parallelization treatment or a non-parallelization process), whereas the non-aqueous electrolyte secondary battery of the present invention is characterized by that it exerts sufficient performances without conducting a non-parallelization treatment on the graphite particles, and the non-parallelization process is not specifically required in order to omit the process, or the non-parallelization may be partially conducted.

As the non-parallelization method mentioned above, for example, a technique including first pulverizing a graphite raw material such as natural graphite or needle coke, mixing the pulverized graphite powder and a binder, conducting a calcination treatment under a pressure, and pulverizing the obtained graphite powder again, is known. By this technique, massive particles of microcrystals in which the directions of the particles are non-parallel can be obtained. As the binder used, pitch and various resins such as phenol resins can be used. In the case when graphite particles in which the orientation plane of each other are bonded or aggregated in non-parallel, spherical graphite particles, or the like are used in combination besides the graphite particles in which the orientation plane of each other are bonded in parallel which are used in the present invention, the use amount of the graphite particles in which the orientation planes are parallel is preferably 50 mass % or more, more preferably 90 mass % or more, further preferably 95 mass % or more, and even more preferably 100 mass %, with respect to the use amount of the entirety of the graphite particles.

In the present invention, graphite particles having exposed crystal faces which have not undergone a surface treatment are used as the negative electrode active material, but it is not necessary to specifically use only the graphite particles having exposed crystal faces since the graphite particles having exposed crystal faces have a high discharge capacity, and thus graphite particles having unexposed crystal faces in part which have undergone a surface treatment may also be used.

As a surface treating agent used in the above-mentioned surface treatment, for example, aggregates, metals (iron, nickel, aluminum, titanium, silicon and the like), tar, pitch, carbon black, thermoplastic resins, thermosetting resins, low crystallinity graphite and the like are used.

The method for the above-mentioned surface treatment is not specifically limited as long as the crystal faces of the graphite particles are coated, and examples may include a method including depositing the graphite used in the negative electrode and the above-mentioned surface treating agent by a chemical vapor deposition method to form a coating, a method including applying by a spray, a method including mixing with a kneader and the like, and the like, and the method is suitably selected according to the particles, surface treating agent, viscosity and the like. The temperature at which the surface treatment is conducted is not specifically limited and varies depending on the surface treatment method. Furthermore, when the above-mentioned surface treating agent is used, heating is sometimes conducted during the surface treatment, and calcination is sometimes conducted after the surface treatment.

In the case when the above-mentioned graphite particles having unexposed crystal faces are used in combination as the graphite particles used in the present invention besides the graphite particles having exposed crystal faces, the use amount of the graphite particles having exposed crystal faces is preferably 50 mass % or more, more preferably 90 mass % or more, further preferably 95 mass % or more, and even more preferably 100 mass %, with respect to the use amount of the entirety of the graphite particles.

Furthermore, the graphite particles used as the negative electrode active material generally have an average particle size of 30 microns or less, but the average particle size is preferably 20 micron or less so as to increase the accuracy in the step of applying the negative electrode. The specific surface area is generally 10 m$^2$/g or less, but is preferably 8 m$^2$/g or less so as to suppress the reductive decomposition reaction of the non-aqueous electrolyte, which is a side reaction on the surface of the negative electrode.

As the negative electrode used in the present invention, a negative electrode obtained by forming a negative electrode material containing graphite particles as the above-mentioned negative electrode active material and a binder and the like into a slurry with an aqueous solvent such as an organic solvent or water, applying the slurry to a current collector, and drying to give a sheet-like form is used.

Examples of the binder used in the negative electrode may include polyvinylidene fluoride, polytetrafluoroethylene, EPDM, SBR, NBR, fluorine rubber, polyacrylic acid, CMC and the like. In addition, the use amount of the above-mentioned binder is preferably 1 to 20 parts by mass, further preferably 1 to 10 parts by mass, with respect to 100 parts by mass of the above-mentioned negative electrode active material.

As the solvent for forming the slurry, aqueous solvents such as organic solvents and water are used, and aqueous solvents are preferably used. Furthermore, the organic solvents may include similar organic solvents to those used in the positive electrode. In addition, the use amount of the above-mentioned solvent is preferably 50 to 300 parts by mass, more preferably 70 to 200 parts by mass, with respect to 100 parts by mass of the above-mentioned negative electrode active material.

As the current collector for the negative electrode, copper, nickel, stainless steel, nickel-plated steel and the like are generally used.

Next, the non-aqueous electrolyte used in the present invention will be explained. The non-aqueous electrolyte used in the present invention contains a phosphate ester compound represented by the above-mentioned general formula (1) to which an alkynyl group is bonded (hereinafter also referred to as an unsaturated phosphate ester compound represented by the above-mentioned general formula (1)) and/or an unsaturated phosphate ester compound represented by the above-mentioned general formula (2).

First, the unsaturated phosphate ester compound represented by the above-mentioned general formula (1) will be explained.

In the above-mentioned general formula (1), $R^1$ and $R^2$ each independently represents a hydrogen atom or an alkyl group having 1 to 8 carbon atom(s). Examples of the alkyl group having 1 to 8 carbon atom(s) may include methyl, ethyl, propyl, isopropyl, butyl, isobutyl, sec-butyl, t-butyl, pentyl, isopentyl, sec-pentyl, t-pentyl, hexyl, sec-hexyl, heptyl, sec-heptyl, octyl, sec-octyl, 2-methylpentyl, 2-ethylhexyl and the like. As $R^1$ and $R^2$, a hydrogen atom, methyl, ethyl and propyl are preferable, a hydrogen atom and methyl are more preferable, and a hydrogen atom is even more preferable, since an adverse effect on the transfer of lithium ions is little and the charging property is fine.

$R^3$ represents an alkyl group having 1 to 8 carbon atom(s), an alkenyl group having 2 to 8 carbon atoms, an alkynyl group having 2 to 8 carbon atoms or a halogenated alkyl group having 1 to 8 carbon atom(s). The alkyl group having 1 to 8 carbon atom(s) may include the alkyl groups as exemplified in the explanations on $R^1$ and $R^2$. Examples of the alkenyl group having 2 to 8 carbon atoms may include vinyl, allyl, 3-butenyl, isobutenyl, 4-pentenyl, 5-hexenyl, 6-heptenyl, 7-octenyl and the like. Examples of the alkynyl group having 2 to 8 carbon atoms may include ethynyl, 2-propynyl (also referred to as propargyl), 3-butynyl, 1-methyl-2-propynyl and 1,1-dimethyl-2-propynyl. Examples of the halogenated alkyl group having 1 to 8 carbon atom(s) may include chloromethyl, trifluoromethyl, 2-fluoroethyl, 2-chloroethyl, 2,2,2-trifluoroethyl, 2,2,2-trichloroethyl, 1,1,2,2-tetrafluoroethyl, pentafluoroethyl, 3-fluoropropyl, 2-chloropropyl, 3-chloropropyl, 2-chloro-2-propyl, 3,3,3-trifluoropropyl, 2,2,3,3-tetrafluoropropyl, heptafluoropropyl, 2-chlorobutyl, 3-chlorobutyl, 4-chlorobutyl, 3-chloro-2-butyl, 1-chloro-2-butyl, 2-chloro-1,1-dimethylethyl, 3-chloro-2-methylpropyl, 5-chloropentyl, 3-chloro-2-methylpropyl, 3-chloro-2,2-dimethyl, 6-chlorohexyl and the like.

As $R^3$, methyl, ethyl, propyl, isopropyl, butyl, pentyl, 2-propynyl, 3-chloropropyl, 3-chlorobutyl and 4-chlorobutyl are preferable, methyl, ethyl, propyl and 2-propynyl are more preferable, and ethyl and 2-propynyl are even more preferable, since the internal resistance of the non-aqueous electrolyte secondary battery is decreased.

Among the unsaturated phosphate ester compound represented by the above-mentioned general formula (1), examples of the compounds wherein $R^1$ and $R^2$ are hydrogen atoms may include methyl bis(2-propynyl)phosphate, ethyl bis(2-propynyl)phosphate, propyl bis(2-propynyl)phosphate, butyl bis(2-propynyl)phosphate, pentyl bis(2-propynyl)phosphate, allyl bis(2-propynyl)phosphate, tris(2-propynyl)phosphate, 2-chloroethyl bis(2-propynyl) phosphate, 2,2,2-trifluoroethyl bis(2-propynyl)phosphate, 2,2,2-trichloroethyl bis(2-propynyl)phosphate and the like.

Furthermore, among the unsaturated phosphate ester compound represented by the above-mentioned general formula (1), examples of the compounds wherein $R^1$ is methyl and $R^2$ is a hydrogen atom may include methyl bis(1-methyl-2-propynyl)phosphate, ethyl bis(1-methyl-2-propynyl)phosphate, propyl bis(1-methyl-2-propynyl)phosphate, butyl bis(1-methyl-2-propynyl)phosphate, pentyl bis(1-methyl-2-propynyl)phosphate, allyl bis(1-methyl-2-propynyl)phosphate, 2-propynyl bis(1-methyl-2-propynyl)phosphate, tris(1-methyl-1-methyl-2-propynyl)phosphate, 2-chloroethyl bis(1-methyl-2-propynyl)phosphate, 2,2,2-trifluoroethyl bis(1-methyl-2-propynyl)phosphate, 2,2,2-trichloroethyl bis(1-methyl-2-propynyl)phosphate and the like.

Among the unsaturated phosphate ester compound represented by the above-mentioned general formula (1), examples of the compounds wherein $R^1$ and $R^2$ are methyls may include methyl bis(1,1-dimethyl-2-propynyl)phosphate, ethyl bis(1,1-dimethyl-2-propynyl)phosphate, propyl bis(1,1-dimethyl-2-propynyl)phosphate, butyl bis(1,1-dimethyl-2-propynyl)phosphate, pentyl bis(1,1-dimethyl-2-propynyl) phosphate, allyl bis(1,1-dimethyl-2-propynyl)phosphate, 2-propynyl bis(1,1-dimethyl-2-propynyl)phosphate, tris(1,1-dimethyl-2-propynyl)phosphate, 2-chloroethyl bis(1,1-dimethyl-2-propynyl)phosphate, 2,2,2-trifluoroethyl bis(1,1-dimethyl-2-propynyl)phosphate, 2,2,2-trichloroethyl bis(1,1-dimethyl-2-propynyl)phosphate and the like.

As the unsaturated phosphate ester compound represented by the above-mentioned general formula (1), methyl bis(2-propynyl)phosphate, ethyl bis(2-propynyl)phosphate, propyl bis(2-propynyl)phosphate, butyl bis(2-propynyl)phosphate, pentyl bis(2-propynyl)phosphate, tris(2-propynyl)phosphate and 2-chloroethyl bis(2-propynyl)phosphate are preferable, ethyl bis(2-propynyl)phosphate, propyl bis(2-propynyl) phosphate, butyl bis(2-propynyl)phosphate and tris(2-propynyl)phosphate are more preferable, and ethyl bis(2-propynyl) phosphate and tris(2-propynyl)phosphate are even more preferable.

In the non-aqueous electrolyte used in the present invention, in the case when the content of the unsaturated phosphate ester compound represented by the above-mentioned general formula (1) is too small, a sufficient effect cannot be exerted, whereas in the case when the content is too much, an amount-increasing effect that reflects the incorporation amount cannot be obtained, and the properties of the non-aqueous electrolyte may be rather adversely affected; therefore, the content of the above-mentioned unsaturated phosphate ester compound represented by the above-mentioned general formula (1) is preferably 0.001 to 5 mass %, more preferably 0.01 to 4 mass %, and even more preferably 0.03 to 3 mass % in the non-aqueous electrolyte.

Next, the unsaturated phosphate ester compound represented by the above-mentioned general formula (2) will be explained.

In the above-mentioned general formula (2), $R^4$ and $R^5$ each independently represents a hydrogen atom or an alkyl group having 1 to 8 carbon atom(s). Examples of the alkyl group having 1 to 8 carbon atom(s) may include methyl, ethyl, propyl, isopropyl, butyl, isobutyl, sec-butyl, t-butyl, pentyl, isopentyl, sec-pentyl, t-pentyl, hexyl, sec-hexyl, heptyl, sec-heptyl, octyl, sec-octyl, 2-methylpentyl, 2-ethylhexyl and the like. As $R^4$ and $R^5$, a hydrogen atom, methyl, ethyl and propyl are preferable, a hydrogen atom and methyl are more preferable, and a hydrogen atom is even more preferable, since an adverse effect on the transfer of lithium ions is little and the charging property is fine.

$R^6$ represents an alkyl group having 1 to 8 carbon atom(s), an alkenyl group having 2 to 8 carbon atoms, an alkynyl group having 2 to 8 carbon atoms or a halogenated alkyl group having 1 to 8 carbon atom(s). The alkyl group having 1 to 8 carbon atom(s) may include the alkyl groups as exemplified in the explanations on $R^4$ and $R^5$. Examples of the alkenyl group having 2 to 8 carbon atoms may include vinyl, allyl, 3-butenyl, isobutenyl, 4-pentenyl, 5-hexenyl, 6-heptenyl, 7-octenyl and the like. Examples of the alkynyl group having 2 to 8 carbon atoms may include ethynyl, 2-propynyl (also referred to as propargyl), 3-butynyl, 1-methyl-2-propynyl and 1,1-dimethyl-2-propynyl. Examples of the halogenated alkyl group having 1 to 8 carbon atom(s) may include chloromethyl, trifluoromethyl, 2-fluoroethyl, 2-chloroethyl, 2,2,2-trifluoroethyl, 2,2,2-trichloroethyl, 1,1,2,2-tetrafluoroethyl, pentafluoroethyl, 3-fluoropropyl, 2-chloropropyl, 3-chloropropyl, 2-chloro-2-propyl, 3,3,3-trifluoropropyl, 2,2,3,3-tetrafluoropropyl, heptafluoropropyl, 2-chlorobutyl, 3-chlorobutyl, 4-chlorobutyl, 3-chloro-2-butyl, 1-chloro-2-butyl, 2-chloro-1,1-dimethylethyl, 3-chloro-2-methylpropyl, 5-chloropentyl, 3-chloro-2-methylpropyl, 3-chloro-2,2-dimethyl, 6-chlorohexyl and the like.

As $R^6$, methyl, ethyl, propyl, isopropyl, butyl, pentyl, 2-propynyl, 3-chloropropyl, 3-chlorobutyl and 4-chlorobutyl are preferable, methyl, ethyl, propyl and 2-propynyl are further preferable, and methyl and ether are even more preferable, since the internal resistance of the non-aqueous electrolyte secondary battery is decreased.

In the above-mentioned general formula (2), n represents a number of 1 or 2. Since the phosphoric acid ester reaction from an alkyne diol as a raw material is easy and can be obtained with a high yield, n is preferably a number of 2.

Among the unsaturated phosphate ester compound represented by the above-mentioned general formula (2), examples of the compounds wherein n is a number of 1 may include 2-butyne-1,4-diol tetramethyl diphosphate, 2-butyne-1,4-diol tetraethyl diphosphate, 2-butyne-1,4-diol tetrapropyl diphosphate, 2-butyne-1,4-diol tetraisopropyl diphosphate, 2-butyne-1,4-diol tetrabutyl diphosphate, 2-butyne-1,4-diol tetrapentyl diphosphate, 2-butyne-1,4-diol tetrakis(2-propynyl)diphosphate, 2-butyne-1,4-diol tetrakis(3-chloropropyl)diphosphate, 2-butyne-1,4-diol tetrakis(3-chlorobutyl)diphosphate, 2-butyne-1,4-diol tetrakis(4-chlorobutyl)diphosphate and the like, and among these, 2-butyne-1,4-diol tetramethyl diphosphate, 2-butyne-1,4-diol tetraethyl diphosphate, 2-butyne-1,4-diol tetrapropyl diphosphate and 2-butyne-1,4-diol tetrakis(2-propynyl)diphosphate are preferable, 2-butyne-1,4-diol tetramethyl diphosphate and 2-butyne-1,4-diol tetrakis(2-propynyl)diphosphate are more preferable.

Furthermore, among the unsaturated phosphate ester compound represented by the above-mentioned general formula (2), examples of the compounds wherein n is a number of 2 may include 2,4-hexadiyne-1,6-diol tetramethyl diphosphate, 2,4-hexadiyne-1,6-diol tetraethyl diphosphate, 2,4-hexadiyne-1,6-diol tetrapropyl diphosphate, 2,4-hexadiyne-1,6-diol tetraisopropyl diphosphate, 2,4-hexadiyne-1,6-diol tetrabutyl diphosphate, 2,4-hexadiyne-1,6-diol tetrapentyl diphosphate, 2,4-hexadiyne-1,6-diol tetrakis(2-propynyl)diphosphate, 2,4-hexadiyne-1,6-diol tetrakis(3-chloropropyl)diphosphate, 2,4-hexadiyne-1,6-diol tetrakis(3-chlorobutyl)diphosphate, 2,4-hexadiyne-1,6-diol tetrakis(4-chlorobutyl)diphosphate and the like, and among these, 2,4-hexadiyne-1,6-diol tetramethyl diphosphate, 2,4-hexadiyne-1,6-diol tetraethyl diphosphate, 2,4-hexadiyne-1,6-diol tetrapropyl diphosphate and 2,4-hexadiyne-1,6-diol tetrakis(2-propynyl)diphosphate are preferable, and 2,4-hexadiyne-1,6-diol tetramethyl diphosphate and 2,4-hexadiyne-1,6-diol tetrakis(2-propynyl)diphosphate are more preferable.

In the non-aqueous electrolyte used in the present invention, in the case when the content of the unsaturated phosphate ester compound represented by the above-mentioned general formula (2) is too small, a sufficient effect cannot be exerted, whereas in the case when the content is too much, an amount-increasing effect that reflects the incorporation amount cannot be obtained, and the properties of the non-aqueous electrolyte may be rather adversely affected; therefore, the content of the unsaturated phosphate ester compound represented by the above-mentioned general formula (2) is preferably 0.01 to 5 mass %, more preferably 0.03 to 4 mass %, and even more preferably 0.05 to 3 mass % in the non-aqueous electrolyte. Only one kind of the unsaturated phosphate ester compound represented by the above-mentioned general formula (2) may be used, or two or more kinds may be used in combination.

Among the unsaturated phosphate ester compound represented by the above-mentioned general formula (1) and the unsaturated phosphorus ester compound represented by the above-mentioned general formula (2), the unsaturated phosphate ester compound represented by the above-mentioned general formula (1) is preferable in view of easy availability of industrial raw materials, and in the case when the unsaturated phosphate ester compound represented by the above-mentioned general formula (1) and unsaturated phosphate ester compound represented by the above-mentioned general formula (2) are used in combination, the mass ratio of the unsaturated phosphate ester compound represented by the above-mentioned general formula (2) to the unsaturated phosphate ester compound represented by the above-mentioned general formula (1) is preferably 0.05 to 10, more preferably 0.1 to 5, and even more preferably 0.2 to 3. Furthermore, in the case when the total amount of the unsaturated phosphate ester compound represented by the above-mentioned general formula (1) and unsaturated phosphate ester compound represented by the above-mentioned general formula (2) is too much, an amount-increasing effect that reflects the incorporation amount cannot be obtained, and the properties of the non-aqueous electrolyte may be rather adversely affected; therefore, the total amount is preferably 5 mass % or less, more preferably 4 mass % or less, and even more preferably 3 mass % or less.

It is preferable that the non-aqueous electrolyte used in the present invention further contains, as an additive, a cyclic carbonate compound having an unsaturated group, a chain carbonate compound, an unsaturated diester compound, a halogenated cyclic carbonate compound, a cyclic sulfite ester compound or a cyclic sulfuric acid ester compound.

Examples of the above-mentioned cyclic carbonate compound having an unsaturated group may include vinylene carbonate, vinylethylene carbonate, propylidene carbonate, ethylene ethylidene carbonate, ethylene isopropylidene carbonate and the like, and vinylene carbonate and vinylethylene carbonate are preferable.

Examples of the above-mentioned chain carbonate compound may include dipropargyl carbonate, propargyl methyl carbonate, ethyl propargyl carbonate, bis(1-methylpropargyl) carbonate, bis(1-dimethylpropargyl) carbonate and the like.

Examples of the above-mentioned unsaturated diester compound may include dimethyl maleate, diethyl maleate, dipropyl maleate, dibutyl maleate, dipentyl maleate, dihexyl maleate, diheptyl maleate, dioctyl maleate, dimethyl fumarate, diethyl fumarate, dipropyl fumarate, dibutyl fumarate, dipentyl fumarate, dihexyl fumarate, diheptyl fumarate, dioctyl fumarate, acetylene dimethyl dicarboxylate, diethyl acetylenedicarboxylate, dipropyl acetylenedicarboxylate, dibutyl acetylenedicarboxylate, dipentyl acetylenedicarboxylate, dihexyl acetylenedicarboxylate, diheptyl acetylenedicarboxylate, dioctyl acetylenedicarboxylate and the like.

Examples of the above-mentioned halogenated cyclic carbonate compound may include chloroethylene carbonate, dichloroethylene carbonate, fluoroethylene carbonate, difluoroethylene carbonate and the like, examples of the above-mentioned cyclic sulfite ester compound may include ethylene sulfite and the like, and examples of the above-mentioned cyclic sulfuric acid ester may include propanesultone, butanesultone and the like.

Among these additives, vinylene carbonate, vinylethylene carbonate, dipropargyl carbonate, dimethyl acetylenedicarboxylate, diethyl acetylenedicarboxylate, chloroethylene carbonate, dichloroethylene carbonate, fluoroethylene carbonate, ethylene sulfite, propanesultone and butanesultone are preferable, vinylene carbonate, dipropargyl carbonate, dimethyl acetylenedicarboxylate, chloroethylene carbonate, fluoroethylene carbonate, ethylene sulfite and propanesultone are more preferable, vinylene carbonate, dipropargyl carbonate, chloroethylene carbonate, fluoroethylene carbonate, ethylene sulfite and propanesultone are even more preferable.

One of these additives may be used alone, or two or more kinds may be used in combination.

In the non-aqueous electrolyte used in the present invention, in the case when the content of these additives is too small, a sufficient effect cannot be exerted, whereas in the case when the content is too much, an amount-increasing effect that reflects the incorporation amount cannot be obtained, and the properties of the non-aqueous electrolyte may be rather adversely affected; therefore, the content of these additives is preferably 0.005 to 10 mass %, more preferably 0.02 to 5 mass %, and even more preferably 0.05 to 3 mass % in the non-aqueous electrolyte.

As the organic solvent used in the above-mentioned non-aqueous electrolyte, those generally used in non-aqueous electrolytes can be used by one kind or a combination of two or more kinds. Specifically, saturated cyclic carbonate compounds, saturated cyclic ester compounds, sulfoxide compounds, sulfone compounds, amide compounds, saturated chain carbonate compounds, chain ether compounds, cyclic ether compounds, saturated chain ester compounds and the like may be included.

Among the above-mentioned organic solvents, the saturated cyclic carbonate compounds, saturated cyclic ester compounds, sulfoxide compounds, sulfone compounds and amide compound have a high dielectric constant, and thus play a role to increase the dielectric constant of the non-aqueous electrolyte. Among these compounds, the saturated cyclic carbonate compounds are specifically preferable. Examples of such saturated cyclic carbonate compounds may include ethylene carbonate, 1,2-propylene carbonate, 1,3-propylene carbonate, 1,2-butylene carbonate, 1,3-butylene carbonate, 1,1,-dimethylethylene carbonate and the like.

Examples of the above-mentioned saturated cyclic ester compounds may include γ-butyrolactone, γ-valerolactone, γ-caprolactone, δ-hexanolactone, δ-octanolactone and the like.

Examples of the above-mentioned sulfoxide compound may include dimethylsulfoxide, diethylsulfoxide, dipropylsulfoxide, diphenylsulfoxide, thiophene and the like. Examples of the above-mentioned sulfone compound may include dimethylsulfone, diethylsulfone, dipropylsulfone, diphenylsulfone, sulfolane (also referred to as tetramethylenesulfone), 3-methylsulfolane, 3,4-dimethylsulfolane, 3,4-diphenymethylsulfolane, sulfolene, 3-methylsulfolene, 3-ethylsulfolene, 3-bromomethylsulfolene and the like, and sulfolane and tetramethylsulfolane are preferable.

Examples of the above-mentioned amide compound may include N-methylpyrrolidone, dimethylformamide, dimethylacetamide and the like.

Among the above-mentioned organic solvents, the saturated chain carbonate compounds, chain ether compounds, cyclic ether compounds and saturated chain ester compounds can make the battery properties such as output density excellent, for example, they can decrease the viscosity of the non-aqueous electrolyte and can increase the mobility of the electrolyte ions, and the like. Furthermore, since they have a low viscosity, they can increase the performances of the non-aqueous electrolyte at low temperatures. Among these compounds, the saturated chain carbonate compounds are specifically preferable. Such saturated chain carbonate compounds may include dimethyl carbonate (DMC), ethyl methyl carbonate (EMC), diethyl carbonate (DEC), ethyl butyl carbonate, methyl-t-butyl carbonate, diisopropyl carbonate, t-butyl propyl carbonate and the like.

The above-mentioned chain ether compounds or cyclic ether compounds may include dimethoxyethane (DME), ethoxymethoxyethane, diethoxyethane, tetrahydrofuran, dioxolane, dioxane, 1,2-bis(methoxycarbonyloxy)ethane, 1,2-bis(ethoxycarbonyloxy)ethane, 1,2-bis(ethoxycarbonyloxy)propane, ethylene glycol bis(trifluoroethyl) ether, propylene glycol bis(trifluoroethyl) ether, ethylene glycol bis(trifluoromethyl) ether, diethylene glycol bis(trifluoroethyl) ether and the like, and among these, dioxolane is preferable.

As the above-mentioned saturated chain ester compound, monoester compounds and diester compounds having 2 to 8 carbons in a molecule are preferable, and specific compounds may include methyl formate, ethyl formate, methyl acetate, ethyl acetate, propyl acetate, isobutyl acetate, butyl acetate, methyl propionate, ethyl propionate, methyl butyrate, methyl isobutyrate, methyl trimethyl acetate, ethyl trimethyl acetate, methyl malonate, ethyl malonate, methyl succinate, ethyl succinate, methyl 3-methoxypropionate, ethyl 3-methoxypropionate, ethylene glycol diacetyl, propylene glycol diacetyl and the like, and methyl formate, ethyl formate, methyl acetate, ethyl acetate, propyl acetate, isobutyl acetate, butyl acetate, methyl propionate and ethyl propionate are preferable.

As other organic solvents, acetonitrile, propionitrile, nitromethane and derivatives thereof can also be used.

As the electrolyte salt used in the above-mentioned non-aqueous electrolyte, a conventionally-known electrolyte salt is used, and examples may include $LiPF_6$, $LiBF_4$, $LiAsF_6$, $LiCF_3SO_3$, $LiCF_3CO_2$, $LiN(CF_3SO_2)_2$, $LiC(CF_3SO_2)_3$, $LiB(CF_3SO_3)_4$, $LiB(C_2O_4)_2$, $LiBF_2(C_2O_4)$, $LiSbF_6$, $LiSiF_5$, $LiAlF_4$, $LiSCN$, $LiClO_4$, $LiCl$, $LiF$, $LiBr$, $LiI$, $LiAlF_4$, $LiAlCl_4$, $NaClO_4$, $NaBF_4$, $NaI$, and derivatives thereof, and the like, and among these, it is preferable to use one or more kind selected from the group consisting of $LiPF_6$, $LiBF_4$, $LiClO_4$, $LiAsF_6$, $LiCF_3SO_3$ and $LiC(CF_3SO_2)_3$, and derivatives of $LiCF_3SO_3$, and derivatives of $LiC(CF_3SO_2)_3$, since they are excellent in electrical properties.

It is preferable that the above-mentioned electrolyte salt is dissolved in the above-mentioned organic solvent so that the concentration in the non-aqueous electrolyte becomes 0.1 to 3.0 mol/L, specifically 0.5 to 2.0 mol/L. When the concentration of the electrolyte salt is less than 0.1 mol/L, a sufficient current density may not be obtained, whereas when the concentration is more than 3.0 mol/L, the stability of the non-aqueous electrolyte may be impaired.

Furthermore, a halogen-based, phosphorus-based or other flame retarder can be suitably added to the non-aqueous electrolyte used in the present invention so as to impart flame retardancy. In the case when the addition amount of the flame retarder is too small, a sufficient effect cannot be exerted, whereas in the case when the amount is too much, an amount-increasing effect that reflects the addition amount cannot be obtained, and the properties of the non-aqueous electrolyte may be rather adversely affected; therefore, the addition amount of the above-mentioned flame retarder is preferably 5 to 100 mass %, more preferably 10 to 50 mass % with respect to the above-mentioned organic solvent.

Next, the positive electrode used in the present invention will be explained. As the positive electrode used in the present invention, a positive electrode obtained by forming a positive electrode material containing a positive electrode active material, a binder and an electroconductive material and the like into a slurry with an organic solvent or water, applying the slurry to a current collector and drying, and rolling as necessary to give a sheet-like form is used.

Although the above-mentioned positive electrode active material is not specifically limited as long as it can store and release lithium ions in an electrochemical manner, a compound containing lithium and at least one kind of transition metal is preferable, and examples may include lithium-transition metal composite oxides, lithium-containing transition metal phosphoric acid compounds and the like, and these may be used by mixing. As the transition metal for the lithium-transition metal composite oxides, vanadium, titanium, chromium, manganese, iron, cobalt, nickel, copper and the like are preferable. Specific examples of the lithium-transition metal composite oxides may include lithium-cobalt composite oxides such as $LiCoO_2$, lithium-nickel composite oxides such as $LiNiO_2$, lithium-manganese composite oxides such as $LiMnO_2$, $LiMn_2O_4$ and $Li_2MnO_3$, these lithium-transition metal composite oxides in which a part of the main transition metal is substituted with other metal such as aluminum, titanium, vanadium, chromium, manganese, iron, cobalt, lithium, nickel, copper, zinc, magnesium, gallium and zirconium. Specific examples of the substituted lithium-transition metal composite oxides may include $LiNi_{0.5}Mn_{0.5}O_2$, $LiNi_{0.80}Co_{0.17}Al_{0.03}O_2$, $LiNi_{1/3}Co_{1/3}Mn_{1/3}O_2$, $LiMn_{1.8}Al_{0.2}O_4$, $LiMm_{1.5}Ni_{0.5}O_4$ and the like. As the transition metal for the lithium-containing transition metal-phosphoric acid compound, vanadium, titanium, manganese, iron, cobalt, nickel and the like are preferable, and specific examples may include phosphoric acid-iron-lithium compounds such as $LiFePO_4$, phosphoric acid-cobalt-lithium compounds such as $LiCoPO_4$, these lithium-containing transition metal-phosphoric acid compounds in which a part of the main transition metal is substituted with other metal such as aluminum, titanium, vanadium, chromium, manganese, iron, cobalt, lithium, nickel, copper, zinc, magnesium, gallium, zirconium and niobium, and the like.

As the positive electrode active material used in the positive electrode of the non-aqueous electrolyte secondary battery of the present invention, lithium compounds containing cobalt, specifically lithium-cobalt-composite oxides are preferable since a high voltage can be stably obtained, and lithium compounds containing manganese, nickel or iron are more preferable, and lithium-nickel-containing composite oxides or the lithium-nickel-containing composite oxides in which a part of the nickel thereof is substituted with other metal, and phosphoric acid-iron-lithium compounds or the phosphoric acid-iron-lithium compounds in which a part of the iron thereof is substituted with other metal are more preferable, since a high voltage can be obtained and the raw materials are inexpensive.

Examples of the binder for the positive electrode may include, but are not limited to, polyvinylidene fluoride, polytetrafluoroethylene, EPDM, SBR, NBR, fluorine rubber, polyacrylic acid and the like. In addition, the use amount of the above-mentioned binder is preferably 1 to 20 parts by mass, more preferably 1 to 10 parts by mass, with respect to 100 parts by mass of the positive electrode active material.

As the electroconductive material for the positive electrode, microparticles of graphite, carbon blacks such as acetylene black and ketjen black, microparticles and the like of amorphous carbon such as needle coke, carbon nanofiber, and the like are used, but the electroconductive material is not limited to these. In addition, the use amount of the above-mentioned electroconductive material is preferably 1 to 20 parts by mass, more preferably 1 to 10 parts by mass, with respect to 100 parts by mass of the positive electrode active material.

As the solvent for forming a slurry, an organic solvent or water that dissolves the binder is used. Examples of the organic solvent may include, but are not limited to, N-methylpyrrolidone, dimethylformamide, dimethylacetamide, methyl ethyl ketone, cyclohexanone, methyl acetate, methyl acrylate, diethyltriamine, N—N-dimethylaminopropylamine, polyethylene oxide, tetrahydrofuran and the like. In addition, the use amount of the above-mentioned solvent is preferably 50 to 300 parts by mass, more preferably 70 to 200 parts by mass with respect to 100 parts by mass of the positive electrode active material.

For the current collector for positive electrode, aluminum, stainless steel, nickel-plated steel and the like are generally used.

In the non-aqueous electrolyte secondary battery of the present invention, it is preferable to use a separator between the positive electrode and negative electrode, and as the separator, a microporous film of a generally-used polymer can be used without specific limitation. The film may include films formed of polyethylene, polypropylene, polyvinylidene fluoride, polyvinylidene chloride, polyacrylonitrile, polyacrylamide, polytetrafluoroethylene, polysulfone, polyethersulfone, polycarbonate, polyamide, polyimide, polyethers such as polyethylene oxide and polypropylene oxide, celluloses such as carboxymethyl cellulose and hydroxypropyl cellulose, polymer compounds mainly including poly(meth)acrylic acid and various esters thereof and derivatives thereof, and copolymers and mixtures thereof, and the like. These films may be used alone, or these films may be superposed and used as a multilayer film. Furthermore, various additives may be used in these films, and the kinds and contents thereof are not specifically limited. Among these films, films formed of polyethylene, polypropylene, polyvinylidene fluoride, polysulfone are preferably used in the non-aqueous electrolyte secondary battery of the present invention.

These films have been made microporous so that the electrolyte permeates to allow easy permeation of ions. Methods for making the films microporous may include "a phase separation method" in which a solution of a polymer compound and a solvent is formed into a film while conducting microphase separation, and the solvent is removed by extraction to make pores, "a drawing method" in which a molten polymer compound is extruded at a high draft to form a film and heat-treated, crystals are arranged in one direction, and gaps are further formed between the crystals by drawing, and the like, and the method is suitably selected depending on the film as used.

In the non-aqueous electrolyte secondary battery of the present invention, a phenol-based antioxidant, a phosphorus-based antioxidant, a thioether-based antioxidant, a hindered amine compound and the like may be added to the electrode material, non-aqueous electrolyte and separator, for the purpose of further improvement of safeness.

Figure 1:
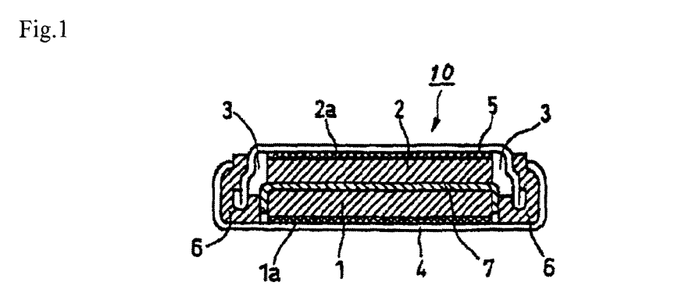
FIG. 1 is a longitudinal cross-sectional drawing showing an example of the structure of the coin-shaped battery of the non-aqueous electrolyte secondary battery of the present invention.

Although the non-aqueous electrolyte secondary battery of the present invention formed of the above-mentioned constitution essentially contains the above-mentioned positive electrode, negative electrode and non-aqueous electrolyte, the shape thereof is not specifically limited, and may be various shapes such as a coin shape, a cylindrical shape and a square shape. FIG. 1 shows an example of the coin-shaped battery of the non-aqueous electrolyte secondary battery of the present invention, and FIG. 2 and FIG. 3 each shows an example of the cylindrical battery.

In the coin-shaped non-aqueous electrolyte secondary battery 10 shown in FIG. 1, 1 is a positive electrode that can release lithium ions, 1a is a positive electrode current collector, 2 is a negative electrode formed of a carboneous material that can store and release lithium ions released from the positive electrode, 2a is negative electrode current collector, 3 is a non-aqueous electrolyte, 4 is a positive electrode case made of stainless, 5 is a negative electrode case made of stainless, 6 is a gasket made of polypropylene, and 7 is a separator made of polyethylene.

Figure 2:
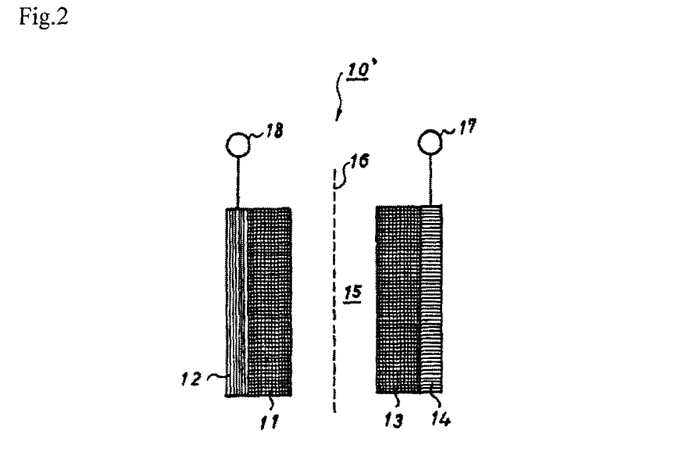
FIG. 2 is a schematic view showing the basic constitution of the cylindrical battery of the non-aqueous electrolyte secondary battery of the present invention.
Figure 3:
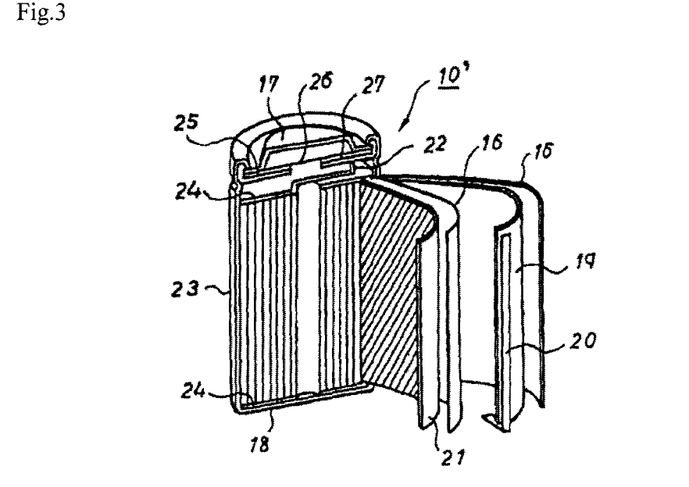
FIG. 3 is a perspective view showing the inner structure of the cylindrical battery of the non-aqueous electrolyte secondary battery of the present invention as a cross-sectional surface.

Furthermore, in the cylindrical non-aqueous electrolyte secondary battery 10' shown in FIG. 2 and FIG. 3, 11 is a negative electrode, 12 is a negative electrode current collector, 13 is a positive electrode, 14 is a positive electrode current collector, 15 is a non-aqueous electrolyte, 16 is a separator, 17 is a positive electrode terminal, 18 is a negative electrode terminal, 19 is a negative electrode plate, 20 is a negative electrode lead, 21 is a positive electrode plate, 22 is a positive electrode lead, 23 is a case, 24 is an insulation plate, 25 is a gasket, 26 is a safety valve, and 27 is a PTC element.

EXAMPLES

Hereinafter the present invention will be explained in more detail by Examples and Comparative Examples. However, the present invention is not construed to be limited by the following Examples and the like. Unless otherwise indicated, the "part(s)" and "%" in Examples are on the mass basis.

Examples 1 to 14 and Comparative Examples 1 to 13

In Examples and Comparative Examples, non-aqueous electrolyte secondary batteries (lithium secondary batteries) were prepared according to the following <Preparation Procedures>.
<Preparation Procedures>
a. Preparation of positive electrode
[Preparation of Positive Electrode A]

90 parts by mass of $LiNi_{1/3}Co_{1/3}Mn_{1/3}O_2$ as a positive electrode active material, 5 parts by mass of acetylene black as an electroconductive material, and 5 parts by mass of polyvinylidene fluoride (PVDF) as a binder were mixed to form a positive electrode material. This positive electrode material was dispersed in 140 parts by mass of N-methyl-2-pyrrolidone (NMP) to give a slurry form. This slurry-like positive electrode material was applied to a positive electrode current collector made of aluminum, dried and press-molded to give a positive electrode plate. Thereafter this positive electrode plate was cut into a predetermined size to thereby make a discoidal positive electrode A.
[Preparation of Positive Electrode B]

72 parts by mass of $LiMn_2O_4$ and 18 parts by mass of $LiNi_{1/3}CO_{1/3}Mn_{1/3}O_2$ as positive electrode active materials, 5 parts by mass of acetylene black as an electroconductive material, and 5 parts by mass of polyvinylidene fluoride (PVDF) as a binder were mixed to form a positive electrode material. This positive electrode material was dispersed in 140 parts by mass of N-methyl-2-pyrrolidone (NMP) to give a slurry form. This slurry-like positive electrode material was applied to a positive electrode current collector made of aluminum, dried and press-molded to give a positive electrode plate. Thereafter this positive electrode plate was cut into a predetermined size to thereby make a discoidal positive electrode B.
b. Preparation of Negative Electrode
[Preparation of Negative Electrode A]

97.0 parts by mass of natural graphite that had not undergone a surface treatment having an interlayer distance of a crystal of 0.3363 nanometers, an average particle size of 17 microns, a specific surface area of 5.4 m²/g and $I_G/I_D$ of 0.08 as a negative electrode active material, 2.0 parts by mass of a styrene-butadiene rubber as a binder, and 1.0 part by mass of carboxymethyl cellulose as a thickening agent were mixed to form a negative electrode material. This negative electrode material was dispersed in 120 parts by mass of water to give a slurry form. This slurry-like negative electrode material was applied to a negative electrode current collector made of copper, dried and press-molded to give a negative electrode plate. Thereafter this negative electrode plate was cut into a predetermined size to thereby make a discoidal negative electrode A.
[Preparation of Negative Electrode B]

97.0 parts by mass of natural graphite that had not undergone a surface treatment having an interlayer distance of a crystal of 0.3363 nanometer, an average particle size of 10 microns, a specific surface area of 6.3 m²/g and $I_G/I_D$ of 0.08 as a negative electrode active material, 2.0 parts by mass of a styrene-butadiene rubber as a binder, and 1.0 part by mass of carboxymethyl cellulose as a thickening agent were mixed to form a negative electrode material. This negative electrode material was dispersed in 120 parts by mass of water to give a slurry form. This slurry-like negative electrode material was applied to a negative electrode current collector made of copper, dried and press-molded to give a negative electrode plate. Thereafter this negative electrode plate was cut into a predetermined size to thereby make a discoidal negative electrode B.
[Preparation of Negative Electrode C]

97.0 parts by mass of artificial graphite that had not undergone a surface treatment having an interlayer distance of a crystal of 0.3380 nanometer, an average particle size of 20 microns, a specific surface area of 2.0 m²/g and $I_G/I_D$ of 0.08 as a negative electrode active material, 2.0 parts by mass of a styrene-butadiene rubber as a binder, and 1.0 part by mass of carboxymethyl cellulose as a thickening agent were mixed to form a negative electrode material. This negative electrode material was dispersed in 120 parts by mass of water to give a slurry form. This slurry-like negative electrode material was applied to a negative electrode current collector made of copper, dried and press-molded to give a negative electrode plate. Thereafter this negative electrode plate was cut into a predetermined size to thereby make a discoidal negative electrode C.
[Preparation of Negative Electrode D]

97.0 parts by mass of artificial graphite that had not undergone a surface treatment having an interlayer distance of a crystal of 0.3385 nanometer, an average particle size of 20 microns, a specific surface area of 1.9 m²/g and $I_G/I_D$ of 0.08 as a negative electrode active material, 2.0 parts by mass of a styrene-butadiene rubber as a binder, and 1.0 part by mass of carboxymethyl cellulose as a thickening agent were mixed to form a negative electrode material. This negative electrode material was dispersed in 120 parts by mass of water to give a slurry form. This slurry-like negative electrode material was applied to a negative electrode current collector made of copper, dried and press-molded to give a negative electrode plate. Thereafter this negative electrode plate was cut into a predetermined size to thereby make a discoidal negative electrode.

In the preparations of the above-mentioned negative electrodes A and B, either natural graphite used as the negative electrode active material contained graphite particles having an exposed crystal face and a discoidal shape, and the graphite particles were bonded with each other so as to be parallel to the crystal face (orientation plane) of each other.

Furthermore, in the preparations of the above-mentioned negative electrodes C and D, either artificial graphite used as the negative electrode active material contained graphite particles having an exposed crystal face and a platelet shape, and the graphite particles were bonded with each other so as to be parallel to the crystal face (orientation plane) of each other.

c. Preparation of Non-Aqueous Electrolyte

[Preparation of Electrolyte Solution A]

$LiPF_6$ was dissolved by a concentration of 1 mol/L in a mixed solvent formed of 30 vol % of ethylene carbonate, 40 vol % of ethyl methyl carbonate, 25 vol % of dimethyl carbonate and 5 vol % of propyl acetate to thereby prepare an electrolyte solution A.

[Preparation of Electrolyte Solution B]

$LiPF_6$ was dissolved by a concentration of 1 mol/L in a mixed solvent formed of 30 vol % of ethylene carbonate, 40 vol % of ethyl methyl carbonate and 30 vol % of dimethyl carbonate to thereby prepare an electrolyte solution B.

[Preparation of Non-Aqueous Electrolyte]

The following compounds A1 to A3, compounds A'1 to A'4, and compounds B1 to B2 were each dissolved in the electrolyte solution A or B at a ratio shown in the following Table 1 or 2 to thereby prepare the non-aqueous electrolytes of the present invention and for comparison. The numbers in the brackets in Table 1 and Table 2 represent the concentrations (mass %) in the non-aqueous electrolyte.

[Phosphoric Acid Ester Compounds Represented by the General Formula (1)]

Compound A1: ethyl bis(2-propynyl)phosphate
  Compound A2: tris(2-propynyl)phosphate

[Phosphoric Acid Ester Compound Represented by the General Formula (2)]

Compound A3: 2,4-hexadiyne-1,6-diol tetraethyl diphosphate

[Cyclic Carbonate Compound having Unsaturated Group]

Compound B1: vinylene carbonate

[Cyclic Sulfuric Acid Ester Compound]

Compound B2: propanesultone

[Phosphoric Acid Ester Compounds for Comparison]

Compound A'1: 1,6-hexanediol tetramethyl diphosphate
  Compound A'2: triethyl phosphate
  Compound A'3: tribenzyl phosphate
  Compound A'4: triallyl phosphate d. Assembly of Battery A microporous film made of polyethylene having a thickness of 25 μm was interposed between the obtained discoidal positive electrode A or B and the discoidal negative electrode A, B, C or D and retained in a case. Thereafter each non-aqueous electrolyte was injected into the case so that the combination of the non-aqueous electrolyte of the present invention or for comparison, positive electrode and negative electrode became Table 1 or Table 2, and the case was tightly closed and sealed to make a coin-shaped lithium secondary battery having a diameter of 20 mm and a thickness of 3.2 mm, thereby the non-aqueous electrolyte secondary batteries of Examples 1 to 14 and Comparative Examples 1 to 13 were obtained.

TABLE 1

| | Electrolyte additive | | Electrolyte solution | Positive electrode | Negative electrode |
|---|---|---|---|---|---|
| Example 1 | A1(0.5) | — | A | A | A |
| Example 2 | A2(0.5) | — | A | A | A |
| Example 3 | A3(0.5) | — | A | A | A |
| Example 4 | A2(0.5) | B1(0.5) | A | A | A |
| Example 5 | A2(0.5) | B2(2.0) | A | A | A |
| Example 6 | A2(0.5) | — | B | A | A |
| Example 7 | A1(0.5) | — | A | A | B |
| Example 8 | A2(0.5) | — | A | A | B |
| Example 9 | A3(0.5) | — | A | A | B |
| Example 10 | A1(0.5) | — | A | B | A |
| Example 11 | A2(0.5) | — | A | B | A |
| Example 12 | A3(0.5) | — | A | B | A |
| Example 13 | A1(0.5) | — | A | A | C |
| Example 14 | A1(0.5) | — | A | A | D |

TABLE 2

| | Electrolyte additive | | Electrolyte solution | Positive electrode | Negative electrode |
|---|---|---|---|---|---|
| Comparative Example 1 | — | — | A | A | A |
| Comparative Example 2 | A'1 (0.5) | — | A | A | A |
| Comparative Example 3 | A'2 (0.5) | — | A | A | A |
| Comparative Example 4 | A'3 (0.5) | — | A | A | A |
| Comparative Example 5 | A'4 (0.5) | — | A | A | A |
| Comparative Example 6 | A'2 (0.5) | B1(0.5) | A | A | A |
| Comparative Example 7 | A'2 (0.5) | B2(2.0) | A | A | A |
| Comparative Example 8 | A'2 (0.5) | — | A | A | B |
| Comparative Example 9 | A'2 (0.5) | — | A | B | A |
| Comparative Example 10 | — | B1(0.5) | A | A | A |
| Comparative Example 11 | — | B1(0.5) | A | B | A |
| Comparative Example 12 | — | B2(2.0) | A | A | A |
| Comparative Example 13 | — | B2(2.0) | A | B | A |

Using the lithium secondary batteries of Examples 1 to 14 and Comparative Examples 1 to 13, initial property tests and cycle property tests were conducted by the following test methods. In the initial property tests, discharge capacity ratios (%) and internal resistance ratios (%) were obtained. Furthermore, in the cycle property tests, discharge capacity maintenance rates (%) and internal resistance increase rates (%) were obtained. These test results are shown in the following Table 3 and Table 4. A non-aqueous electrolyte secondary battery having finer initial property has a higher discharge capacity ratio and a lower value of an internal resistance ratio. Furthermore, a non-aqueous electrolyte secondary battery having finer cycle property has a higher discharge capacity maintenance rate and a lower internal resistance increase rate.

<Method for Initial Property Test in Case of Positive Electrode A> a. Method for Measuring Discharge Capacity Ratio

The lithium secondary battery was put into a thermostatic bath at 20° C., and operations in which charging is conducted at a constant current and a constant voltage up to 4.3V at a charge current of 0.3 mA/cm² (a current value corresponding to 0.2 C) and discharging is conducted at a constant current up to 3.0 V at a discharge current of 0.3 mA/cm² (a current value corresponding to 0.2 C) were repeated five times. Thereafter charging was conducted at a constant current and a constant voltage up to 4.3 V at a charge current of 0.3 mA/cm², and discharged at a constant current up to 3.0 V at a discharge current of 0.3 mA/cm². This discharge capacity that was measured at the sixth time was defined as the initial discharge capacity of the battery, and as shown in the following formula, a discharge capacity ratio (%) was obtained as the rate of the initial discharge capacity in the case when the initial discharge capacity of Example 1 is 100.

Discharge capacity ratio (%)=[(Initial discharge capacity)/(Initial discharge capacity in Example 1)]×100 b. Method for Measuring Internal Resistance Ratio

The above-mentioned lithium secondary battery after the measurement of the sixth discharge capacity was first charged at a constant current so that SOC became 60% at a charge current of 1.5 mA/cm² (a current value corresponding to 1 C), and scanned by using an alternate current impedance measurement apparatus (manufactured by IVIUM TECHNOLOGIES, trade name: a mobile type potentiostat Compact Stat) up to a frequency of 100 kHz to 0.02 Hz to thereby prepare a Cole-Cole Plot in which the longitudinal axis indicates an imaginary part and the vertical axis indicates a real part. Next, in this Cole-Cole Plot, the circular arc part was fit to a circle, and the larger value of the two points intersecting with the real part of this circle was defined as the initial internal resistance of the battery, and as shown in the following formula, an internal resistance ratio (%) was obtained as a ratio of the initial internal resistance in the case when the initial internal resistance in Example 1 is 100.

Internal resistance ratio (%)=[(initial internal resistance)/(initial internal resistance in Example 1)]×100

<Method for Initial Property Test in Case of Positive Electrode B>

The lithium secondary battery was put into a thermostatic bath at 20° C., and operations in which charging is conducted at a constant current and a constant voltage up to 4.2 V at a charge current of 0.3 mA/cm² (a current value corresponding to 0.2 C) and discharging is conducted at a constant current up to 3.0 V at a discharge current of 0.3 mA/cm² (a current value corresponding to 0.2 C) were repeated five times. Thereafter charging was conducted at a constant current and a constant voltage up to 4.2 V at a charge current of 0.3 mA/cm², and discharging was conducted at a constant current up to 3.0 V at a discharge current of 0.3 mA/cm². This discharge capacity that was measured at the sixth time was defined as the initial discharge capacity of the battery, and a discharge capacity ratio (%) was obtained in a similar manner to the method for the initial property test in the case of the positive electrode A. Furthermore, for the lithium secondary battery after the measurement of the sixth discharge capacity, an internal resistance ratio (%) was obtained in a similar manner to the method for the initial property test in the case of the positive electrode A.

<Method for Cycle Property Test in Case of Positive Electrode A> a. Method for Measuring Discharge Capacity Maintenance Rate

The lithium secondary battery after the initial property test was put into a thermostatic bath at 60° C., and cycles wherein charging is conducted at a constant current up to 4.3V at a charge current of 1.5 mA/cm² (a current value corresponding to 1 C, wherein 1 C is a current value at which a battery capacity is discharged in 1 hour) and discharging is conducted at a constant current up to 3.0 V at a discharge current of 1.5 mA/cm² in each cycle were repeatedly conducted 300 times. This 300$^{th}$ discharge capacity was defined as a discharge capacity after the cycle test, and as shown in the following formula, a discharge capacity maintenance rate (%) was obtained as a ratio of the discharge capacity after the cycle test in the case when the initial discharge capacity of each battery is 100.

Discharge capacity maintenance rate (%)=[(discharge capacity after cycle test)/(initial discharge capacity)]×100 b. Method for Measuring Internal Resistance Increase Rate

After the cycle test, the atmosphere temperature was returned to 20° C., and an internal resistance at 20° C. was measured in a similar manner to the method for measuring the above-mentioned internal resistance ratio, and the internal resistance at this time was defined as an internal resistance after the cycle test, and as shown in the following formula, an internal resistance increase rate (%) was obtained as a ratio of increase in the internal resistance after the cycle test in the case when the initial internal resistance of each battery is 100.

Internal resistance increase rate (%)=[(internal resistance after cycle test−initial internal resistance)/(initial internal resistance)]×100

<Method for Cycle Property Test in Case of Positive Electrode B>

The lithium secondary battery after the initial property test was put into a thermostatic bath at 60° C., and cycles wherein charging is conducted at a constant current up to 4.2V at a charge current of 1.5 mA/cm² (a current value corresponding to 1 C, wherein 1 C is a current value at which a battery capacity is discharged in 1 hour) and discharging is conducted at a constant current up to 3.0 V at a discharge current of 1.5 mA/cm² in each cycle were repeatedly conducted 300 times. This 300$^{th}$ discharge capacity was defined as a discharge capacity after the cycle test, and a discharge capacity maintenance rate (%) was obtained in a similar manner to the method for the cycle property test in the case of the positive electrode A. Furthermore, for the lithium secondary battery after the cycle test, an internal resistance increase rate (%) was obtained in a similar manner to the method for the cycle property test in the case of the positive electrode A.

TABLE 3

|  | Initial properties | | Cycle property test | |
| --- | --- | --- | --- | --- |
|  | Discharge capacity ratio (%) | Internal resistance ratio (%) | Discharge capacity maintenance rate (%) | Internal resistance increase rate (%) |
| Example 1 | 100 | 100 | 78 | 28 |
| Example 2 | 102 | 98 | 81 | 26 |
| Example 3 | 99 | 101 | 78 | 28 |
| Example 4 | 102 | 97 | 82 | 25 |
| Example 5 | 101 | 102 | 82 | 29 |
| Example 6 | 100 | 97 | 81 | 27 |
| Example 7 | 100 | 99 | 77 | 27 |
| Example 8 | 102 | 98 | 80 | 29 |
| Example 9 | 98 | 101 | 79 | 30 |
| Example 10 | 102 | 124 | 72 | 39 |
| Example 11 | 99 | 121 | 74 | 37 |
| Example 12 | 98 | 125 | 71 | 39 |
| Example 13 | 97 | 98 | 78 | 26 |
| Example 14 | 93 | 97 | 77 | 27 |

TABLE 4

|  | Initial properties | | Cycle property test | |
| --- | --- | --- | --- | --- |
|  | Discharge capacity ratio (%) | Internal resistance ratio (%) | Discharge capacity maintenance rate (%) | Internal resistance increase rate (%) |
| Comparative Example 1 | 101 | 121 | 57 | 67 |
| Comparative Example 2 | 100 | 125 | 55 | 69 |
| Comparative Example 3 | 98 | 129 | 56 | 68 |
| Comparative Example 4 | 99 | 127 | 30 | 91 |
| Comparative Example 5 | 100 | 128 | 40 | 85 |
| Comparative Example 6 | 100 | 117 | 69 | 50 |
| Comparative Example 7 | 101 | 128 | 67 | 54 |
| Comparative Example 8 | 89 | 117 | 51 | 77 |
| Comparative Example 9 | 97 | 131 | 47 | 62 |
| Comparative Example 10 | 100 | 120 | 68 | 41 |
| Comparative Example 11 | 100 | 134 | 59 | 51 |
| Comparative Example 12 | 99 | 125 | 67 | 35 |
| Comparative Example 13 | 99 | 137 | 62 | 49 |

As is apparent from the results in the above-mentioned Table 3 and Table 4, it was able to be confirmed that the non-aqueous electrolyte secondary battery of the present invention, which is characterized by having a negative electrode containing graphite particles having an exposed crystal face and being bonded with each other so as to be parallel to the orientation plane of each other as a negative electrode active material, a positive electrode containing a lithium-containing oxide of a transition metal or a lithium-containing phosphate of a transition metal as a positive electrode active material, and a non-aqueous electrolyte, and containing an unsaturated phosphoric acid ester compound represented by the above-mentioned general formula (1) or (2) in the non-aqueous electrolyte secondary battery, is excellent in internal resistance and discharge capacity and can maintain excellent battery properties after a cycle test at 60° C. Specifically, it was able to be confirmed that more excellent battery properties can be maintained since the discharge capacity ratio increases as the interlayer distance of a crystal of the graphite particles used as the negative electrode active material becomes shorter, i.e., as the crystallinity of the graphite particles becomes higher.

INDUSTRIAL APPLICABILITY

The non-aqueous electrolyte secondary battery of the present invention can maintain a small internal resistance and a high discharge capacity even in the cases of use for a long period and in the cases when temperature change is significant. Such non-aqueous electrolyte secondary battery can be used in various applications such as video cameras, digital cameras, portable music players, sound recorders, portable DVD players, portable game consoles, notebook-size personal computers, electronic dictionaries, electronic diaries, electronic books, mobile phones, portable televisions, power-assisted bicycles, battery automobiles and hybrid automobiles, and among these, the non-aqueous electrolyte secondary battery can be preferably used in battery automobiles and hybrid automobiles which are sometimes used in high temperature states.

REFERENCE SIGNS LIST

1 Positive electrode
1a Positive electrode current collector
2 Negative electrode
2a Negative electrode current collector
3 Non-aqueous electrolyte
4 Positive electrode case
5 Negative electrode case
6 Gasket
7 Separator
10 Coin-shaped non-aqueous electrolyte secondary battery
10' Cylindrical non-aqueous electrolyte secondary battery
11 Negative electrode
12 Negative electrode current collector
13 Positive electrode
14 Positive electrode current collector
15 Non-aqueous electrolyte
16 Separator
17 Positive electrode terminal
18 Negative electrode terminal
19 Negative electrode plate
20 Negative electrode lead
21 Positive electrode plate
22 Positive electrode lead
23 Case
24 Insulation plate
25 Gasket
26 Safety valve
27 PTC element

The invention claimed is:

1. A non-aqueous electrolyte secondary battery having a negative electrode containing graphite particles as a negative electrode active material, a positive electrode containing a lithium-containing oxide of a transition metal or a lithium-containing phosphate of a transition metal as a positive electrode active material, and a non-aqueous electrolyte in which a lithium salt is dissolved in an organic solvent,
wherein the graphite particles have an exposed crystal face and are bonded with each other so as to be parallel to the orientation plane of each other, and the non-aqueous electrolyte contains an unsaturated phosphate ester compound represented by the following general formula (2):

(2)

wherein $R^4$ and $R^5$ each independently represents a hydrogen atom or an alkyl group having 1 to 8 carbon atom(s), $R^6$ represents an alkyl group having 1 to 8 carbon atom(s), an alkenyl group having 2 to 8 carbon atoms, an alkynyl group having 2 to 8 carbon atoms or a halogenated alkyl group having 1 to 8 carbon atom(s), and n represents a number of 1 or 2.

2. The non-aqueous electrolyte secondary battery according to claim 1, wherein a crystal of the graphite particles has an interlayer distance of 0.3354 to 0.3385 nanometer.

3. The non-aqueous electrolyte secondary battery according to claim 2, wherein the graphite particles are natural graphite.

4. The non-aqueous electrolyte secondary battery according to claim 2, wherein the graphite particles are artificial graphite.

5. The non-aqueous electrolyte secondary battery according to claim 2, wherein the non-aqueous electrolyte contains a cyclic carbonate compound having an unsaturated group, a chain carbonate compound, an unsaturated diester compound, a halogenated cyclic carbonate compound, a cyclic sulfite ester compound or a cyclic sulfuric acid ester compound.

6. The non-aqueous electrolyte secondary battery according to claim 5, wherein the graphite particles have a ratio of a peak intensity around 1,360 cm$^{-1}$ ($I_D$) to a peak intensity around 1,580 cm$^{-1}$ ($I_G$) in argon laser Raman spectroscopy at a wavelength of 514.5 nanometers of 0.10 or less.

7. The non-aqueous electrolyte secondary battery according to claim 2, wherein the graphite particles have a ratio of a peak intensity around 1,360 cm$^{-1}$ ($I_D$) to a peak intensity around 1,580 cm$^{-1}$ ($I_G$) in argon laser Raman spectroscopy at a wavelength of 514.5 nanometers of 0.10 or less.

8. The non-aqueous electrolyte secondary battery according to claim 1, wherein the graphite particles are natural graphite.

9. The non-aqueous electrolyte secondary battery according to claim 8, wherein the non-aqueous electrolyte contains a cyclic carbonate compound having an unsaturated group, a chain carbonate compound, an unsaturated diester compound, a halogenated cyclic carbonate compound, a cyclic sulfite ester compound or a cyclic sulfuric acid ester compound.

10. The non-aqueous electrolyte secondary battery according to claim 9, wherein the graphite particles have a ratio of a peak intensity around 1,360 cm$^{-1}$ ($I_D$) to a peak intensity around 1,580 cm$^{-1}$ ($I_G$) in argon laser Raman spectroscopy at a wavelength of 514.5 nanometers of 0.10 or less.

11. The non-aqueous electrolyte secondary battery according to claim 8, wherein the graphite particles have a ratio of a peak intensity around 1,360 cm$^{-1}$ ($I_D$) to a peak intensity around 1,580 cm$^{-1}$ ($I_G$) in argon laser Raman spectroscopy at a wavelength of 514.5 nanometers of 0.10 or less.

12. The non-aqueous electrolyte secondary battery according to claim 1, wherein the graphite particles are artificial graphite.

13. The non-aqueous electrolyte secondary battery according to claim 12, wherein the non-aqueous electrolyte contains a cyclic carbonate compound having an unsaturated group, a chain carbonate compound, an unsaturated diester compound, a halogenated cyclic carbonate compound, a cyclic sulfite ester compound or a cyclic sulfuric acid ester compound.

14. The non-aqueous electrolyte secondary battery according to claim 13, wherein the graphite particles have a ratio of a peak intensity around 1,360 cm$^{-1}$ ($I_D$) to a peak intensity around 1,580 cm$^{-1}$ ($I_G$) in argon laser Raman spectroscopy at a wavelength of 514.5 nanometers of 0.10 or less.

15. The non-aqueous electrolyte secondary battery according to claim 12, wherein the graphite particles have a ratio of a peak intensity around 1,360 cm$^{-1}$ ($I_D$) to a peak intensity around 1,580 cm$^{-1}$ ($I_G$) in argon laser Raman spectroscopy at a wavelength of 514.5 nanometers of 0.10 or less.

16. The non-aqueous electrolyte secondary battery according to claim 1, wherein the non-aqueous electrolyte contains a cyclic carbonate compound having an unsaturated group, a chain carbonate compound, an unsaturated diester compound, a halogenated cyclic carbonate compound, a cyclic sulfite ester compound or a cyclic sulfuric acid ester compound.

17. The non-aqueous electrolyte secondary battery according to claim 16, wherein the graphite particles have a ratio of a peak intensity around 1,360 cm$^{-1}$ ($I_D$) to a peak intensity around 1,580 cm$^{-1}$ ($I_G$) in argon laser Raman spectroscopy at a wavelength of 514.5 nanometers of 0.10 or less.

18. The non-aqueous electrolyte secondary battery according to claim 1, wherein the graphite particles have a ratio of a peak intensity around 1,360 cm$^{-1}$ ($I_D$) to a peak intensity around 1,580 cm$^{-1}$ ($I_G$) in argon laser Raman spectroscopy at a wavelength of 514.5 nanometers of 0.10 or less.

19. A non-aqueous electrolyte secondary battery having a negative electrode containing graphite particles as a negative electrode active material, a positive electrode containing a lithium-containing oxide of a transition metal or a lithium-containing phosphate of a transition metal as a positive electrode active material, and a non-aqueous electrolyte in which a lithium salt is dissolved in an organic solvent, wherein the graphite particles have an exposed crystal face and are bonded with each other so as to be parallel to the orientation plane of each other, and the non-aqueous electrolyte contains a phosphate ester compound represented by the following general formula (1) to which an alkynyl group is bonded and an unsaturated phosphate ester compound represented by the following general formula (2):

(1)

wherein R$^1$ and R$^2$ each independently represents a hydrogen atom or an alkyl group having 1 to 8 carbon atom(s), and R$^3$ represents an alkyl group having 1 to 8 carbon atom(s), an alkenyl group having 2 to 8 carbon atoms, an alkynyl group having 2 to 8 carbon atoms or a halogenated alkyl group having 1 to 8 carbon atom(s), (2)

wherein R$^4$ and R$^5$ each independently represents a hydrogen atom or an alkyl group having 1 to 8 carbon atom(s), R$^6$ represents an alkyl group having 1 to 8 carbon atom(s), an alkenyl group having 2 to 8 carbon atoms, an alkynyl group having 2 to 8 carbon atoms or a halogenated alkyl group having 1 to 8 carbon atom(s), and n represents a number of 1 or 2.

* * * * *